(12) United States Patent
Kinjou et al.

(10) Patent No.: US 8,675,373 B2
(45) Date of Patent: Mar. 18, 2014

(54) ELECTRONIC APPARATUS

(75) Inventors: Kazuyuki Kinjou, Ota-ku (JP);
Masataka Tokoro, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 149 days.

(21) Appl. No.: 13/208,165

(22) Filed: Aug. 11, 2011

(65) Prior Publication Data

US 2012/0039058 A1    Feb. 16, 2012

(30) Foreign Application Priority Data

Aug. 11, 2010 (JP) ................................. 2010-180591

(51) Int. Cl.
*H05K 7/02* (2006.01)
*H05K 7/04* (2006.01)
*H05K 5/00* (2006.01)
*H05K 7/00* (2006.01)
*G06F 1/16* (2006.01)

(52) U.S. Cl.
USPC .. 361/807; 361/752; 361/679.02; 361/679.01

(58) Field of Classification Search
USPC ............. 361/752, 753, 755, 759, 679.02, 807
See application file for complete search history.

(56) References Cited

U.S. PATENT DOCUMENTS

| | | | |
|---|---|---|---|
| 7,630,199 B2 | 12/2009 | Shigenobu et al. | |
| 2007/0293005 A1 | 12/2007 | Shigenobu et al. | |
| 2009/0267266 A1 | 10/2009 | Lee et al. | |
| 2009/0278282 A1 | 11/2009 | Lee et al. | |
| 2009/0315788 A1 | 12/2009 | Hirota | |
| 2009/0323266 A1* | 12/2009 | Mizuno | 361/679.02 |
| 2010/0067205 A1* | 3/2010 | Tanaka | 361/752 |
| 2010/0073897 A1* | 3/2010 | Tachikawa | 361/807 |

FOREIGN PATENT DOCUMENTS

| | | |
|---|---|---|
| JP | 02-058485 B2 | 12/1990 |
| JP | 04-001376 U | 1/1992 |
| JP | 2001-273753 A | 10/2001 |
| JP | 2008-003714 A | 1/2008 |
| JP | 2009-262530 A | 11/2009 |
| JP | 2010-010822 A | 1/2010 |

OTHER PUBLICATIONS

Notification of Reasons for Refusal mailed by Japan Patent Office on Jun. 12, 2012 in the corresponding Japanese patent application No. 2010-180591.

* cited by examiner

*Primary Examiner* — Hoa C Nguyen
*Assistant Examiner* — Ahmad D Barnes
(74) *Attorney, Agent, or Firm* — Knobbe, Martens, Olson & Bear LLP

(57) ABSTRACT

According to one embodiment, an electronic apparatus includes: an opening portion; a housing provided with a first through hole and a second through hole that are situated near the opening portion, respectively; a display accommodated in the housing; an antenna provided near the opening portion; an antenna cover that covers the opening portion, the first through hole and the second through hole; and a joint portion which joins the housing and the antenna cover, and has a first portion in which a first front end portion protrudes from the first through hole to the housing inside, and a second portion in which a second front end portion is situated in the second through hole.

6 Claims, 15 Drawing Sheets

ELECTRONIC APPARATUS

CROSS REFERENCE TO RELATED APPLICATION(S)

The application is based upon and claims the benefit of priority from Japanese Patent Application No. 2010-180591 filed on Aug. 11, 2010, the entire contents of which are incorporated herein by reference.

BACKGROUND

1. Field

The present invention relates to an electronic apparatus including an antenna cover.

2. Description of the Related Art

A portable computer is disclosed in which an antenna cover made of resin is attached to a metallic cover of a liquid crystal display. The portable computer includes a liquid crystal display, a cover surrounding the periphery thereof, an opening portion provided in a part of the cover, an antenna element provided near the opening portion on the cover, and an antenna cover provided so as to block the opening portion. The antenna cover has a protrusion that is an attachment portion for being attached to the cover. The cover has a groove, into which the protrusion is fitted, in the vicinity of the opening portion.

The antenna cover is fixed to the opening portion of the cover by applying heat to the protrusion to weld the protrusion around the groove.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

DETAILED DESCRIPTION

Hereinafter, an electronic apparatus will be described with reference to FIGS. 1 to 6. In the present specification, a front side (that is, a user side) is defined as a front direction F, an inside when seen from a user is defined as a rear direction R, a left side when seen from a user is defined as a left direction, a right side when seen from a user is defined as a right direction, an upper part when seen from a user is defined as an upper direction, and a lower part when seen from a user is defined as a lower direction.

Figure 1:
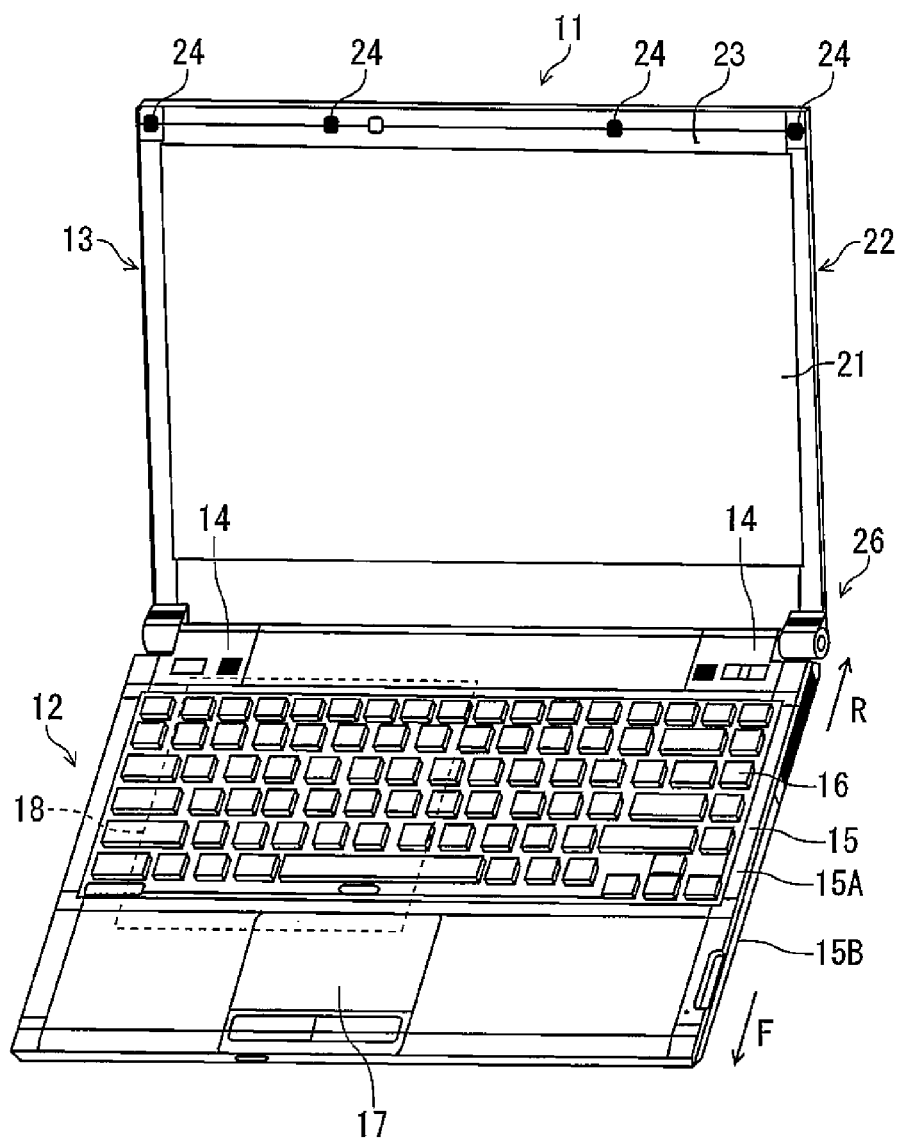
FIG. 1 is a perspective view showing a portable computer that is an example of an electronic apparatus of a first embodiment.

As shown in FIG. 1, a portable computer 11, which is an example of an electronic apparatus, includes a main body unit 12 and a display unit 13. The main body unit 12 has a hinge portion 14, and the hinge portion 14 rotatbly supports the display unit 13.

Figure 2:
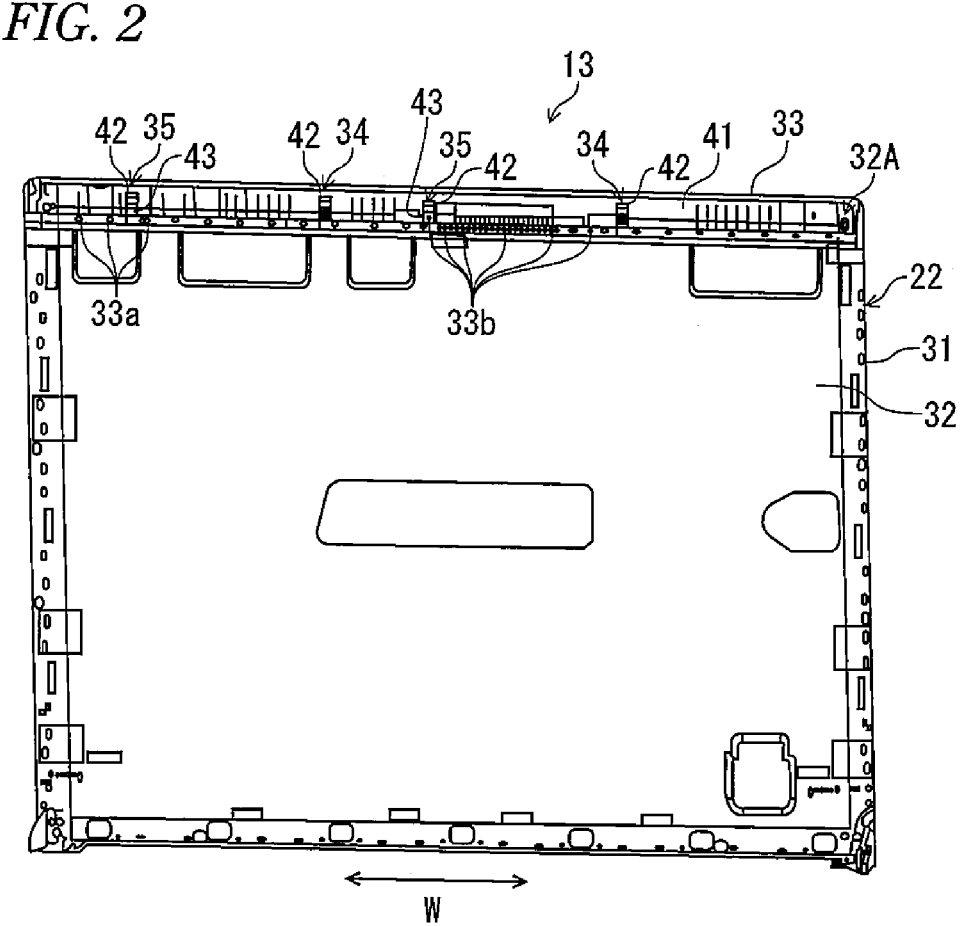
FIG. 2 is a perspective view that shows a cover of the portable computer shown in FIG. 1 from the inside.

As shown in FIGS. 1 and 2, the main body unit 12 includes, for example, a main body cabinet 15 formed in a box shape by a metal such as a magnesium alloy, a keyboard 16 attached to an upper surface of the main body cabinet 15, a touch pad 17 provided on an upper surface of the main body cabinet 15, and a print circuit board 18 accommodated in an inner portion of the main body cabinet 15. The print circuit board 18 has circuit components such as a CPU, a RAM or a ROM and collectively controls the entire portable computer 11. The main body cabinet 15 has an upper case 15A which constitutes an upper half portion thereof and to which the keyboard 16 is fixed, and a lower case 15B which constitutes a lower half portion.

The display unit 13 has a display 21, a display cabinet 22 formed of a synthetic resin which surrounds the periphery of the display 21, and a plurality of cushion members 24 which is attached to a mask 23 of the display cabinet 22. The display 21 is, for example, constituted by a liquid crystal display panel, in the present embodiment, but it may be another type of display panel.

Figure 5:
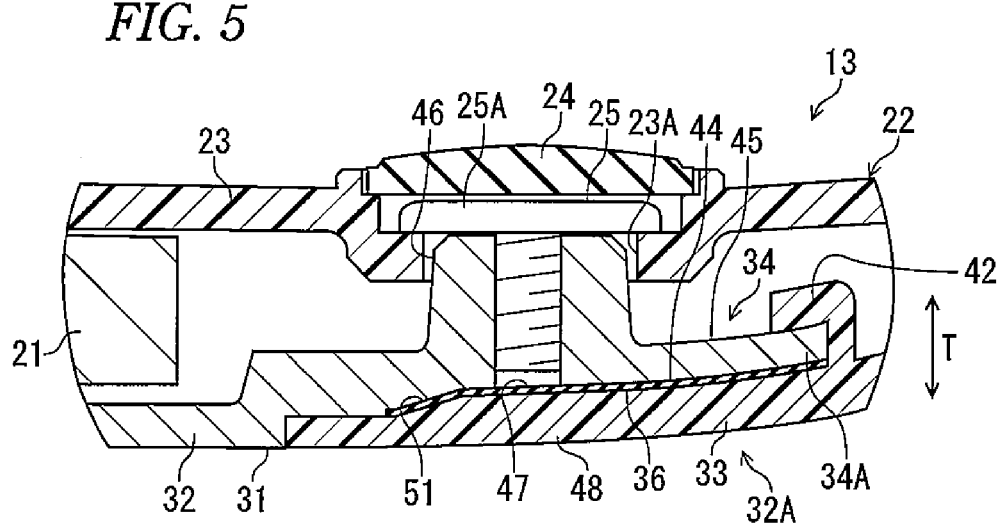
FIG. 5 is a cross-sectional view taken along lines F3-F3 of the cover and the mask shown in FIG. 3.

As shown in FIGS. 1 and 5, the cushion member 24 is constituted by, for example, a rubber or the like with elasticity. The cushion member 24 is fixed to the mask 23, which is a second case, at a position corresponding to a head portion 25A of a screw 25 described later. The cushion member 24 is adapted to collide with the main body unit 12, upon being rotated to a position where the display unit 13 overlaps with the main body unit 12, that is, a position where a mask 23, which is a second case of the display cabinet 22, faces the main body unit 12. In addition, in the present embodiment, the housing 26 includes a main body cabinet 15 and a display cabinet 22.

As shown in FIG. 5, the display cabinet 22 has a cover 31 which is a first case covering a rear surface of the display 21, a mask 23 which is a second case covering a front surface of the display 21, and a screw 25 fixing the mask 23 to the cover 31. The mask 23 is provided separately from the cover 31, and is formed, for example, in a flat frame shape by a synthetic resin material. As shown in FIG. 5, the mask 23 has a through hole 23A through which a boss 46 of a cover 31 describe later and the screw 25 are passed.

As shown in FIG. 2, the cover 31 is one in which a synthetic resin is integrally formed in a part of a metallic base, and is formed in a flat plate shape as a whole. That is, as shown in FIGS. 2 and 5, the cover 31 has a metallic portion 32 provided with an opening portion 32A, a resin portion 33 formed integrally with the metallic portion 32 so as to cover the opening portion 32A, a first protrusion portion 34 and a second protrusion portion 35 extending from the metallic portion 32 toward the resin portion 33, and a sheet-shaped blocking member bonded to the first protrusion portion 34. The metallic portion 32 is formed by, for example, a magnesium alloy or the like, but other metallic materials may be used.

The resin portion 33 is a so-called antenna cover, and a plurality of antennas is disposed inside thereof. The plurality of antennas (the antenna circuit substrates) corresponds to the respective methods such as a communication method such as Bluetooth (registered trademark) or a wireless LAN, a wireless WAN, WiMAX, UWB or GPS, or a mobile phone method such as 3G or 3.5G. The plurality of antennas is provided near the opening portion 32A. The plurality of antennas is bonded to an inner surface of the resin portion 33 side by side.

Figure 3:
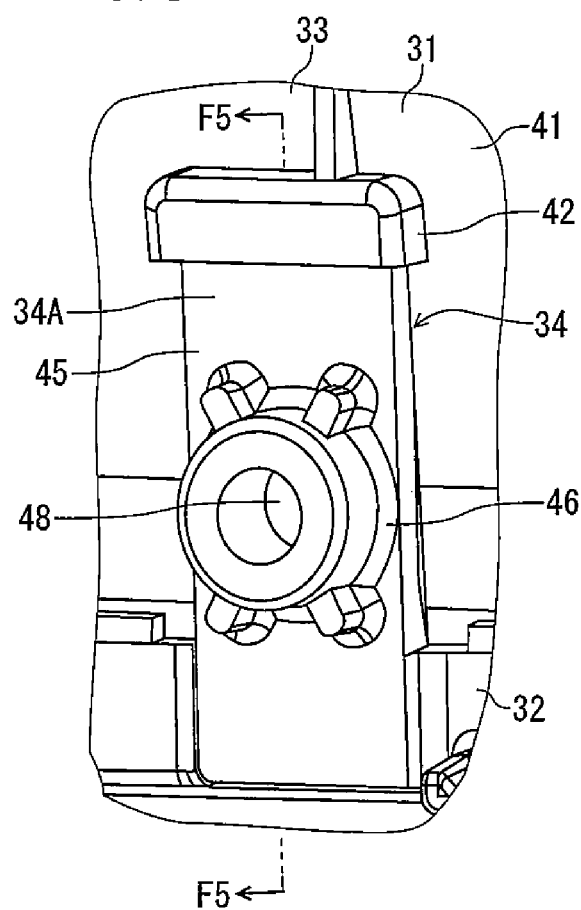
FIG. 3 is a perspective view that shows the periphery of a first protrusion portion of the cover shown in FIG. 2 in an enlarged manner.
Figure 6:
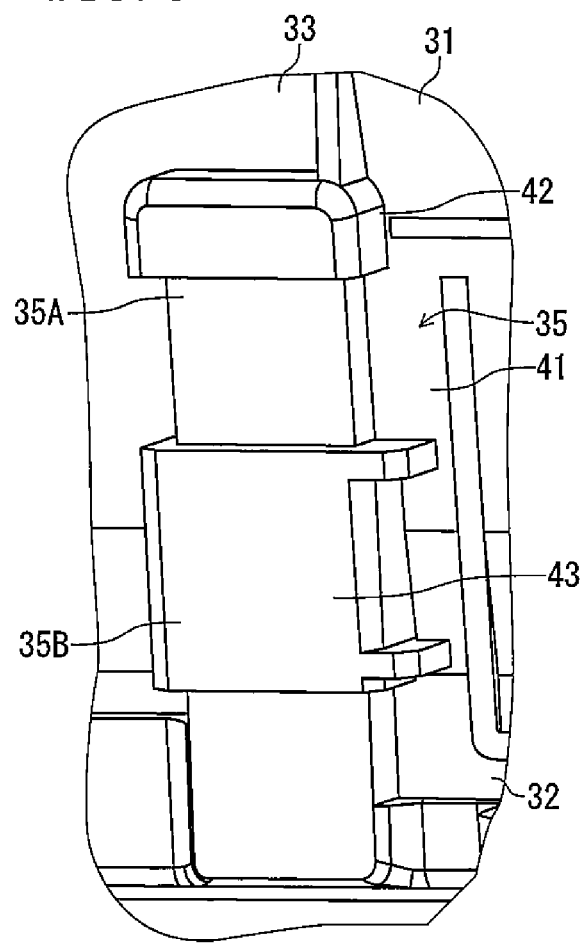
FIG. 6 is a perspective view in which the second protrusion portion shown in FIG. 3 is seen from a surface of an opposite side of a surface facing a resin portion.

The resin portion 33 is formed integrally with the metallic portion 32 by a so-called insert molding that uses the metallic portion 32 as an insert. The resin portion 33 is formed by the synthetic resin material. As shown in FIGS. 2, 3 and 6, the resin portion 33 has a main body portion 41, a plurality of first holding portions 42 protruding from the main body portion 41, a plurality of second holding portions 43 protruding from the main body portion 41, a first portion 33a and a second portion 33b. The first portion 33a and the second portion 33b are provided in a portion (a joint portion) 323 where the resin portion 33 overlaps with the metallic portion 32. The respective first holding portions 42 protrude from the main body portion 41 so as to surround a first front end portion 34A of the first protrusion portion 34 or a second front end portion 35A of the second protrusion portion 35. The respective first holding portions 42 form bag shapes together with the main body portion 41.

The respective second holding portions 43 protrude from the main body portion 41 so as to surround the periphery near a second base portion 35B of a side opposite to the second front end portion 35A of the second protrusion portion 35. The respective second holding portions 43 form tubular shapes together with the main body portion 41.

Figure 4:
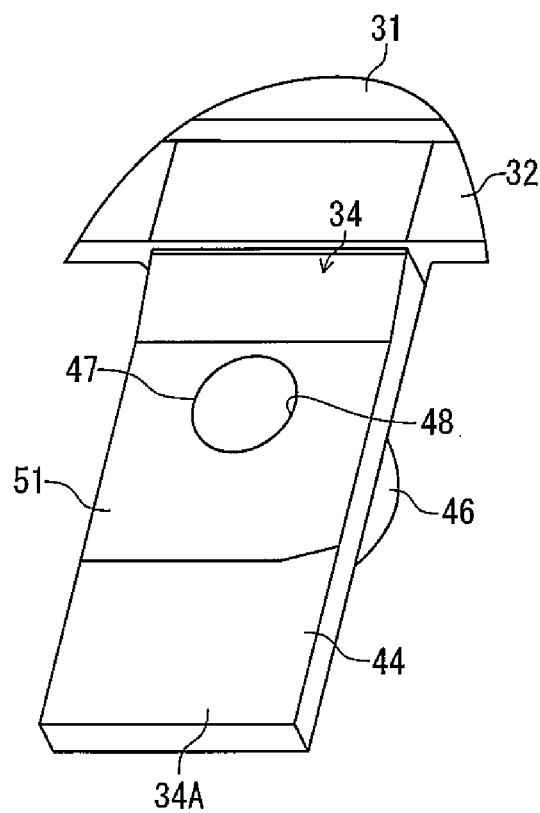
FIG. 4 is a perspective view in which the first protrusion portion shown in FIG. 3 is seen from a surface of an opposite side of a surface facing a resin portion.

As shown in FIG. 3, the first protrusion portion 34 is formed integrally with the metallic portion 32 and forms a small piece shape protruding toward the resin portion 33. As shown in FIG. 5, the first protrusion portion 34 overlaps with the resin portion 33 in a thickness direction T of the resin portion 33. As shown in FIGS. 3 and 5, the first protrusion portion 34 has a boss 46 on a surface 45 of a side opposite to a surface facing the resin portion (a surface directing the resin portion) 44. As shown in FIGS. 4 and 5, in the first protrusion portion 34, there are provided an opening 47 provided on the surface 44 facing the resin portion, and a screw hole 48, which is extended from the opening 47 and passes through the boss 46 of the first protrusion portion 34 in the thickness direction T. On the surface 44 of the first protrusion portion 34 facing the resin portion, a concave portion 51, for example, having a depth of about 0.1 mm for disposing the blocking member 36 is provided. The blocking member 36 is fitted into the concave portion 51.

As shown in FIG. 6, the second protrusion portion 35 is integral with the metallic portion 32 and has a small piece shape protruding toward the resin portion 33. The second protrusion portion 35 overlaps with the resin portion 33 in the thickness direction T of the resin portion 33. In the second protrusion portion 35, the boss 46 and the screw hole 48 are provided. As shown in FIG. 2, the first protrusion portion 34 and the second protrusion portion 35 are alternately disposed in a width direction W of the cover 31 perpendicular to the front and rear direction of the portable computer 11 at a certain gap.

As shown in FIG. 5, the blocking member 36 is provided at a position of being pinched between the first protrusion portion 34 and the resin portion 33. The blocking member 36 is an example of an interposition member interposed between the first protrusion portion 34 and the resin portion 33. The blocking member 36 is constituted by, for example, a heat-resistant tape having a thickness of about 0.1 mm. More specifically, the blocking member 36 is a Kapton (registered trademark) tape, and is a member in which a silicone-based adhesive is applied on one surface of a polyimide film having a heat resistance. The blocking member 36 blocks the opening 47 of the first protrusion portion 34.

Next, a configuration of the first portion 33a and the second portion 33b of the present embodiment will be described with reference to FIGS. 7 to 11. As shown in FIGS. 7 to 10, the first portion 33a and the second portion 33b protrude from the main body portion 41 and are extended to the inner portions of the opening portions (the first through hole and the second through hole) 32a and 32b provided in the metallic portion 32. The first portion 33a and the second portion 33b have approximately the same inner diameters as the diameters of the opening portions 32a and 32b and are fitted into the opening portions 32a and 32b.

Figure 10:
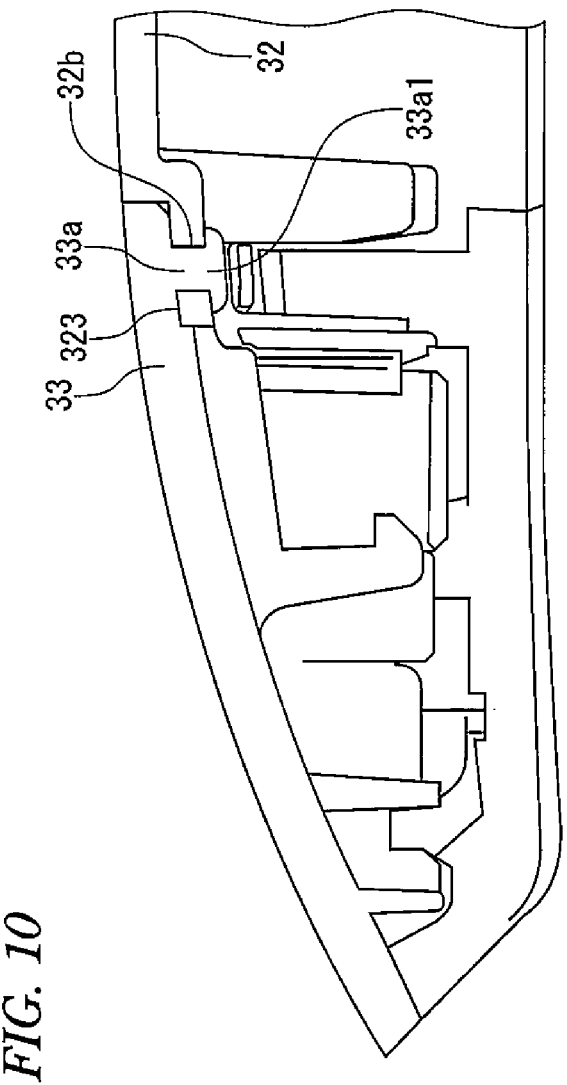
FIG. 10 is a cross-sectional view that shows the first portion of the resin portion shown in FIG. 7.

As shown in FIG. 10, the first portion 33a has a first front end portion 33a1 protruded from the opening portion 32a toward a housing inner portion. The first front end portion 33a1 is fixed to an opening portion of the cover by applying the heat to the protrusion portion made of the synthetic resin material passing through the opening portion 32a to weld the protrusion portion around the groove. Thus, an outer edge size of the first front end portion 33a1 is greater than the diameter of the opening portion 32a.

Figure 7:
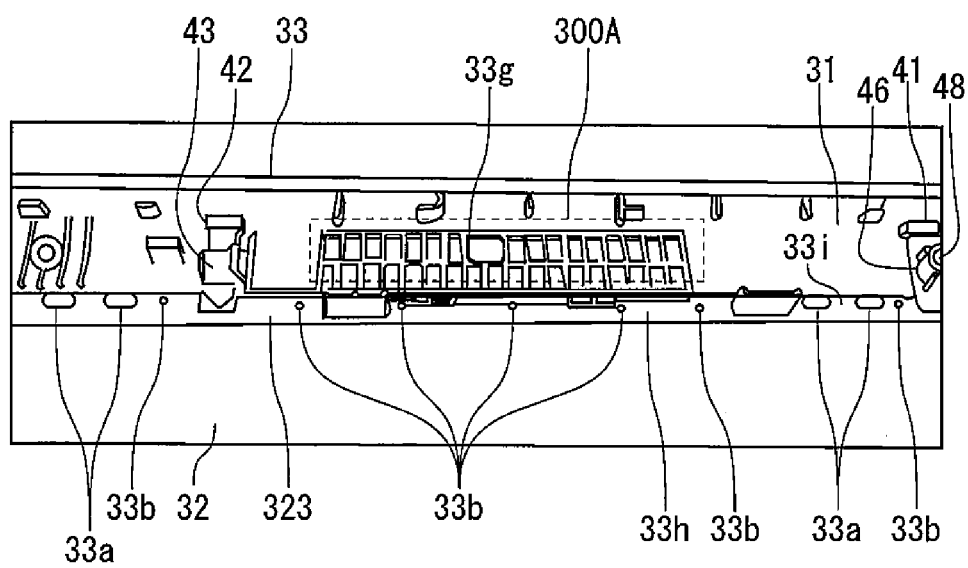
FIG. 7 is a perspective view that shows the resin portion of the portable computer shown in FIG. 1 from the inside.

As shown in FIG. 7, an outer edge shape of the first front end portion 33a1 has a shape such as an oval or an elongated circle extended along a longitudinal direction of the housing cover 31. For example, a display housing of the portable computer 11 requires a design similar to the outer edge size of the display device 21 in order to achieve miniaturization and thinning. However, by extending the outer edge shape of the first front end portion 33a1 in the longitudinal direction of the housing cover 31 as in the present embodiment, the welding surface can be expanded without enlarging the display housing, and the joint force between the metallic portion 32 and the resin portion 33 can be raised.

Figure 8:
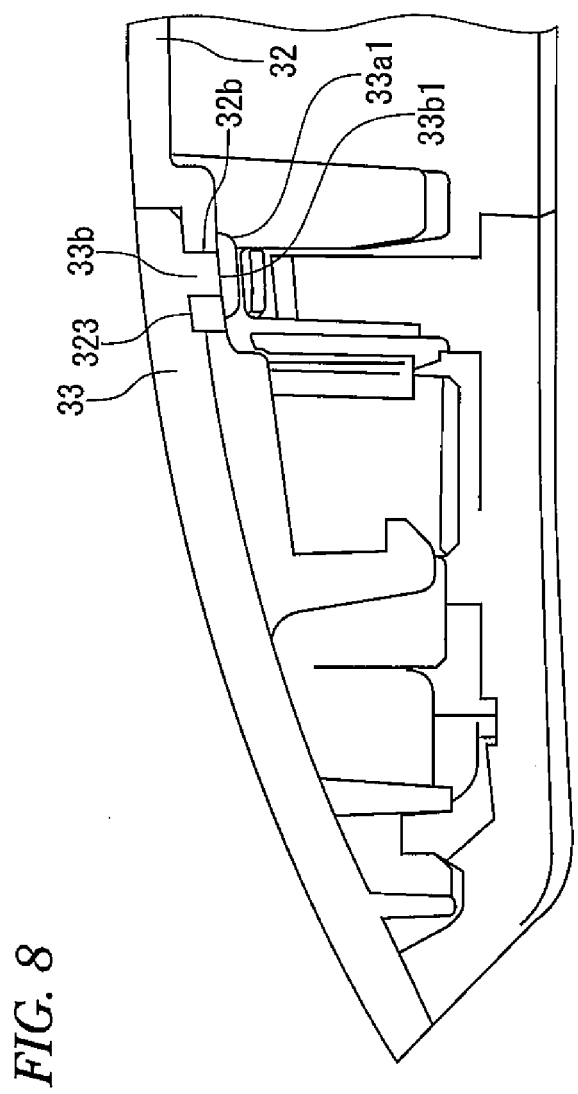
FIG. 8 is a cross-sectional view that shows a second portion of the resin portion shown in FIG. 7.
Figure 9:
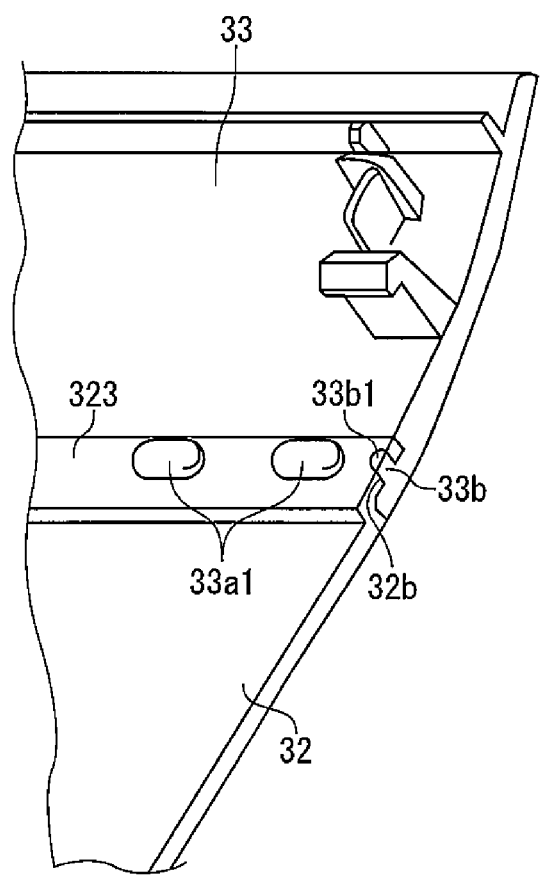
FIG. 9 is a perspective cross-sectional view that shows the second portion of the resin portion shown in FIG. 1 from the inside of the portable computer.
Figure 11:
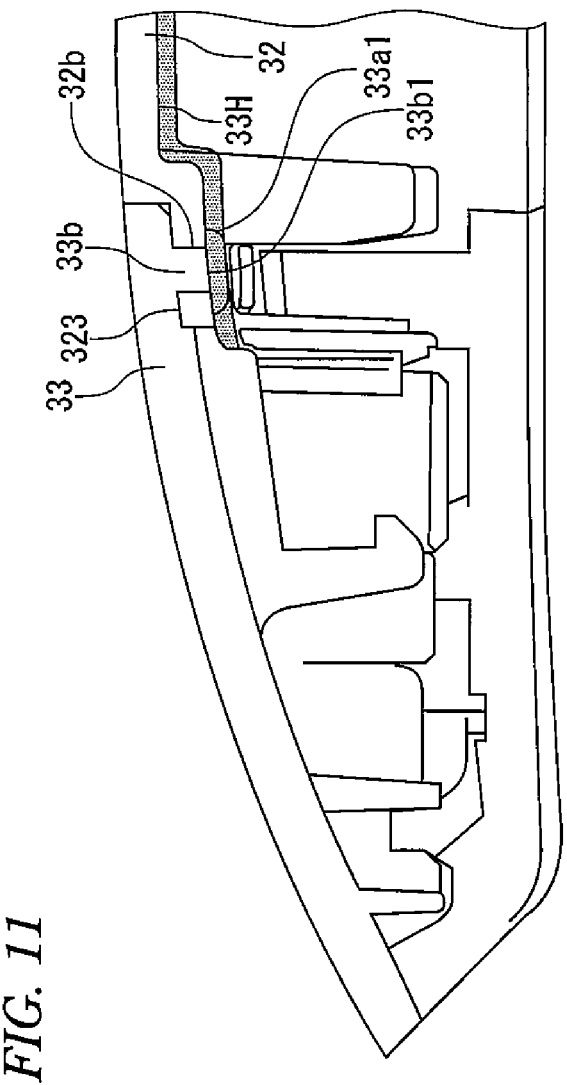
FIG. 11 is a cross-sectional view that shows a case where other components are disposed in the second portion of the resin portion shown in FIG. 7.
Figure 12:
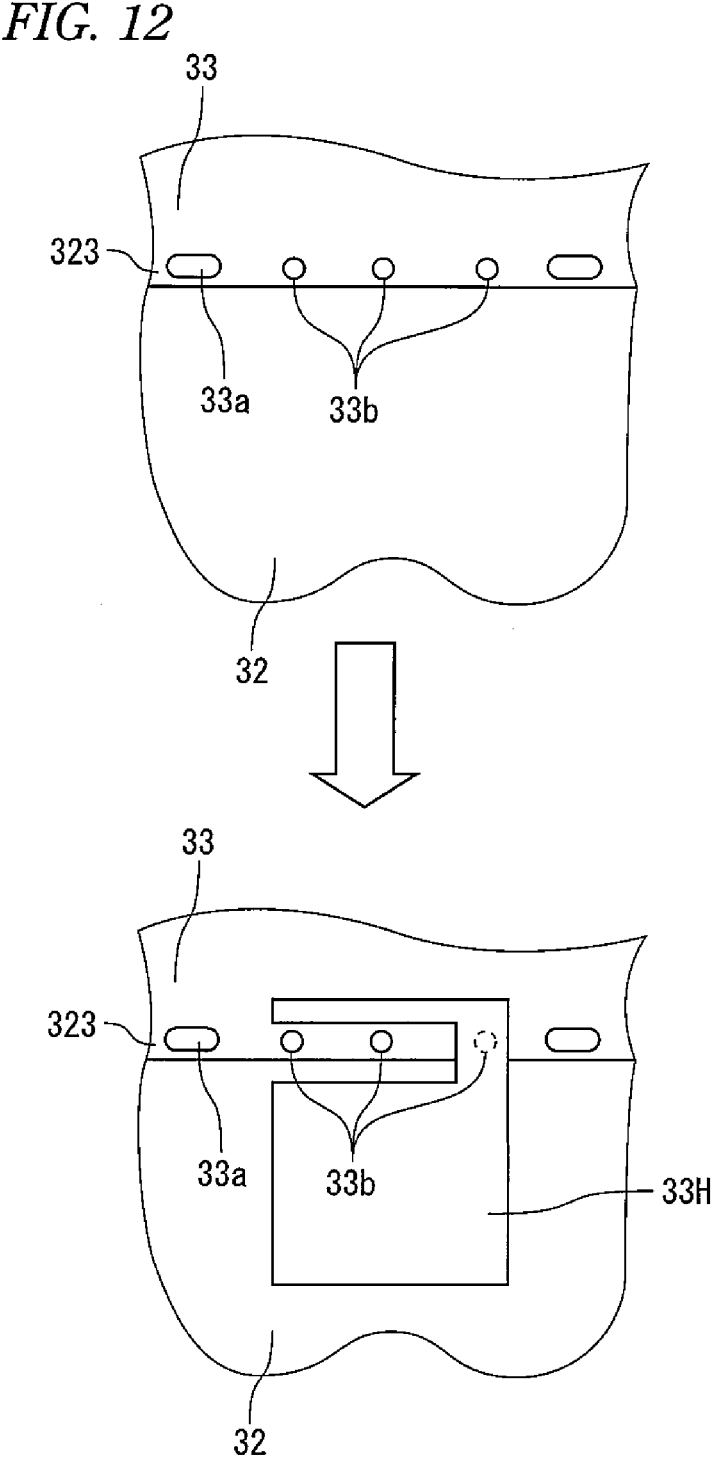
FIG. 12 is a diagram that shows a case where other components are disposed in the second portion of the resin portion shown in FIG. 7.

As shown in FIGS. 8 and 9, the second portion 33b has a second front end portion 33b1. In the present embodiment, the outer edge size of the second front end portion 33b1 is provided so as to be approximately the same as the diameter of the opening portion 32b. The second front end portion 33b1 is situated in the state of being situated in an inner portion of the opening portion 32b or in the state of being approximately the same surface as the inner surface of the metallic portion 32 provided with the opening portion 32a. That is, the second front end portion 33b1 does not protrude from the inner surface of the metallic portion 32 as compared to the first front end portion 33a1. By having such a configuration, as shown in FIGS. 11 and 12, it is possible to provide an antenna component 33H, an insulator or the like in a region, where the second portion 33*b* is provided, in an overlapped manner, which can realize high density mounting.

By having the configuration of the present embodiment, in the region where the first portion 33*a* and the second portion 33*b* are situated, the metallic portion 32 and the resin portion 33 can be firmly fixed without interposing a separate member such as an adhesive or a double-sided tape between the metallic portion 32 and the resin portion 33. As a result, in the present embodiment, the thinning of the housing can be further realized.

The first portion 33*a* and the second portion 33*b* can be provided to be thin in a range in which the stiffness thereof is maintained, that is, so as to have a small diameter. Particularly, since the second portion 33*b* can be provided so as to be approximately the same as the diameter of the opening portion 32*b*, an efficient joint effect can be obtained even in a region having a narrow mounting area.

Herein, in a region where a relatively large component is mounted on an antenna cover such as a 3G antenna or 3.5G antenna, there is a possibility in which a region of the periphery thereof is narrowly designed so as to be pressed. For example, as shown in FIG. 7, the peripheral region 33*h* of a region 33*g*, on which the 3G antenna 300A is mounted, becomes narrower than another region 33*i*. It is desirable to provide the second portion 33*b* of the present embodiment in the region having the narrow mounting area and bond the metallic portion 32 and the resin portion 33.

Furthermore, the first portion 33*a* and the second portion 33*b* are alternately provided as far as possible, whereby the bonding force is uniformized. For example, as shown in FIG. 7, in a region 33*h* near the region 33*g* mounting the 3G antenna, a plurality of second portions 33*b* is provided. However, by disposing the first portion 33*a* in regions 33*i* of both ends of the region 33*h* so as to surround the second portions 33*b*, it is possible to prevent a bonding portion near the region 33*g* from being weakly bonded compared to other regions.

In manufacturing the cover 31 of the portable computer 11 of the present embodiment, firstly, the metallic portion 32, the first protrusion portion 34 and the second protrusion portion 35 are integrally formed by the die cast. Next, as shown in FIG. 5, a lower hole passed through the boss 46 of the first protrusion portion 34 in the thickness direction T is provided, and a screw hole 46 (a female screw) along the lower hole using a tap (not shown) is formed. At that time, since the screw hole 48 passes through the first protrusion portion 34 in the thickness direction T, it is possible to form a screw thread in the entire inner surface of the screw hole 48. Next, the first portion 33*a* and the second portion 33*b* are led to the inner portions of the opening portions 32*a* and 32*b* provided in the metallic portion 32, respectively, and a heat-resistant tape, which is the blocking member 36, is bonded to the surface 44 facing to the resin portion of the first protrusion portion 34, thereby blocking the opening 47 on the surface. Moreover, one, in which the metal portion 32, the first protrusion portion 34, the second protrusion portion 35 and the blocking member 36 are integral, is disposed in the inner portion of a mold for the injection molding as an insert. The injection molding is performed in this state to form the resin portion 33 integrated with the metallic portion 32. At that time, since the opening 47 is blocked by the blocking member 36, a situation does not occur where the synthetic resin enters the inner portion of the screw hole 48. Furthermore, since the blocking member 36 is concealed by the resin portion 33, even if the blocking member 36 is provided, the aesthetics of the portable computer 11 are not spoiled.

According to the present embodiment, the portable computer 11 includes a first case provided with the screw hole 48, a second case separated from the first case, and the screw 25 which is passed through the screw hole 48 and fixes the second case to the first case. The first case has the metallic portion 32 provided with the opening portion 32A, the resin portion 33 formed integrally with the metallic portion 32 so as to cover the opening portion 32A, a protrusion portion which is extended from the metallic portion 32 and overlaps with the resin portion 33 in the thickness direction, and a blocking member 36 which is provided in a position between the protrusion portion and the resin portion 33. In the protrusion portion, an opening 47 provided on the surface 44 facing the resin portion, and a screw hole 48 extended from the opening 47 and passed through the protrusion portion in the thickness direction T are provided. The blocking member 36 blocks the opening 47.

Generally, in the case of forming the screw hole (a female screw) having a bottom using a tap, it is difficult to form a structural upper female screw of the tap from a bottom of the lower hole, for example, in the range of about 0.6 mm. This is caused by the fact that the female screw cannot be cut in the vicinity of the front end of the tap. Furthermore, in a case where the screw hole has a bottom, the thickness of the bottom portion needs to secure, for example, at least the thickness about equal to or greater than 0.6 mm considering a tolerance or the like of the lower hole. For this reason, in the case of the general screw hole having the bottom, both of them are added and a loss of size, for example, at least equal to or greater than about 1.2 mm was generated.

According to the above-mentioned configuration, since the screw hole 48 is provided so as to pass through the protrusion portion, it is possible to make the screw length efficient, which is length in which the female screw is actually formed in the screw hole 48, identical to the entire length of the screw hole 48. As a result, the entire length of the screw hole 48 can be shortened, which can reduce the thickness size of the first case. Furthermore, since there is no need to provide the bottom portion of the screw hole 48, the thickness size of the first case can be further reduced as much as the bottom portion. As a result, the portable computer 11 can be further thinned.

Furthermore, since the opening 47 is blocked by the blocking member 36, upon integrally molding the resin portion 33, it is possible to prevent a situation where the resin enters the inner portion of the screw hole 48 to block the screw hole 48. Moreover, since the blocking member 36 has a sheet shape, the thickness size of the first case is not enlarged by the provision of the blocking member 36. Particularly, if, for example, a sheet having a thickness of about 0.1 mm is used as the blocking member 36, it is possible to thin the first case to as little as, for example, about 1.1 mm at least. As a result, the portable computer 1 can be thinned as much as the size.

In this case, in the metallic portion 32, a concave portion 51, into which the blocking member 36 is fitted, is provided. According to such a configuration, it is possible to prevent the thickness of the resin portion 33 from being thinned by the provision of the blocking member 36. As a result, it is possible to make the mobility of the resin satisfactory during extrusion molding, thereby reducing the frequency that generates the defective product in the resin portion 33. As a result, the yield of the first case can be improved.

Furthermore, the resin portion 33 has a first holding portion 42 that surrounds and holds the front end portion of the protrusion portion. According to such a configuration, the strength around the resin portion 33 can be improved. As a result, even when the thinning of the first case is enhanced, it is possible to prevent the strength around the resin portion 33 from declining.

In this case, the portable computer 11 is provided separately from the first case and the second case, and includes the main body unit 12 which rotatably supports the first case and the second case, and the cushion member which is fixed to the second case at a position corresponding to the head portion 25A of the screw 25 and collides with the main body unit 12 when the second case is rotated to a position facing the main body unit 12. According to the configuration, since the cushion member 24 is provided to correspond to the head portion 25A of the screw 25, it is possible to prevent the second case from severely colliding with the main body unit 12 by the cushion member 24. Furthermore, the head portion 25A of the screw 25 can be concealed by the cushion member 24, which can satisfactorily maintain the exterior of the portable computer 11. For this reason, it is further required that the portable computer 11 has a structure of the cushion member 24.

Furthermore, according to the present embodiment, the opening portion 32A, the opening portions 32a and 32b situated near the opening portion 32A, respectively, the antenna cover 33 covering the opening portions, and a joint portion 323, which joins the metallic portion 32 and the resin portion 33, and has the first portion 33a in which the first front end portion 33a1 protrudes from the opening portion 32a to the inside of the housing and the second portion 33b in which the second front end portion 33b1 is situated in the opening portion 32b, are included. In the region where the first portion 33a and the second portion 33b are situated, it is possible to strongly fix the metallic portion 32 and the resin portion 33 without interposing a separate member such as an adhesive or a double-sided tape between the metallic portion 32 and the resin portion 33.

Furthermore, according to the present embodiment, the second portion 33b is provided between the first portions 33a. As a result, the joint force between the metallic portion 32 and the resin portion 33 can be uniformized.

Furthermore, according to the present embodiment, as shown in FIG. 12, the accommodation component 33H is situated between two first front end portions 33a1 protruding from the opening portion 32a to the inside of the housing. As a result, it is possible to realize the high density mounting of the component that effectively utilizes the narrow space.

Furthermore, the second portion 33b is situated closer to the center portion of the housing than the first portion 33a. That is, by providing the first portion 33a having a high joint strength near the periphery of the antenna cover 33, it is possible to further stably join the metallic portion 32 and the resin portion 33.

Next, a second embodiment of an electronic apparatus will be described with reference to FIGS. 13 and 14. The portable computer 11, which is an example of the electronic apparatus of the second embodiment, is different from the first embodiment in the shape of the second portion 33b, but other portions are common to those of the first embodiment. For this reason, the different portions are mainly described, and the common portions are denoted by common reference numerals and the descriptions thereof will be omitted. The portable computer 11 of the second embodiment has the same exterior as that shown in FIG. 1.

Figure 13:
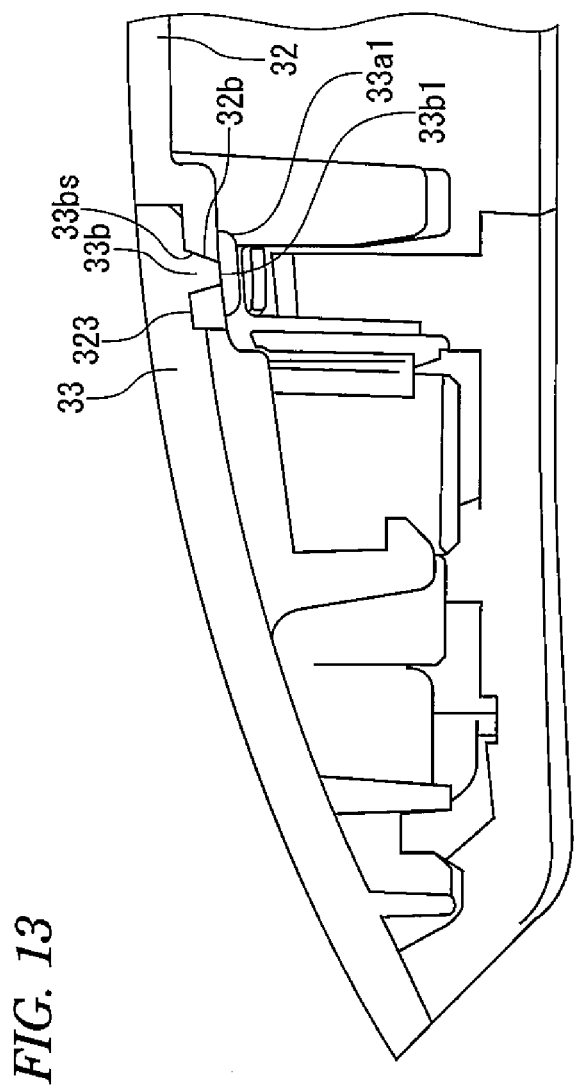
FIG. 13 is a cross-sectional view that shows a second portion of a portable computer which is an example of an electronic apparatus of a second embodiment.
Figure 14:
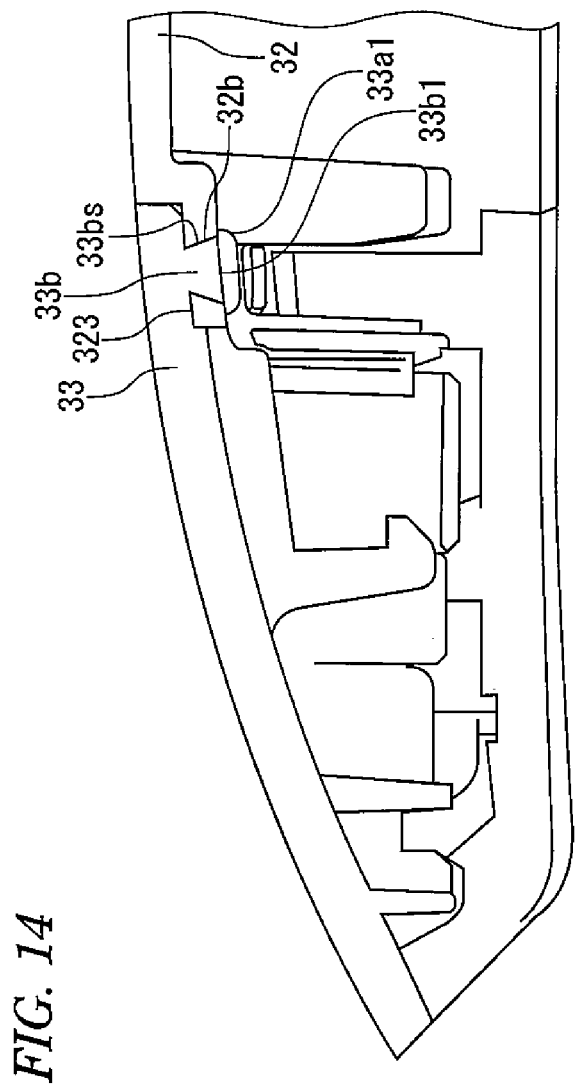
FIG. 14 is a cross-sectional view that shows a second portion of a portable computer which is another example of an electronic apparatus of a second embodiment.

As shown in FIGS. 13 and 14, the second portion 33b of the second embodiment has a slope portion 33bs. By such a configuration, it is possible to increase the contact area between the second portion 33b and the opening portion 32b. The slope portion 33bs shown in FIG. 13 has a widening shape so as to be expanded toward the outside of the housing. The slope portion 33bs shown in FIG. 14 has a widening shape so as to be expanded toward the inside of the housing. In the case of adopting the shape of FIG. 13, it is easier to mount the antenna cover to the housing. Meanwhile, in the case of adopting the shape of FIG. 14, it is possible to improve the joint strength between the housing and the antenna cover.

Next, a third embodiment of an electronic apparatus will be described with reference to FIG. 15. Similarly to the second embodiment, the portable computer 11, which is an example of the electronic apparatus of the third embodiment, is different from the first embodiment in the shape of the second portion 33b, but other portions are common to those of the first embodiment. For this reason, the different portions are mainly described, and the common portions are denoted by common reference numerals and the descriptions thereof will be omitted. The portable computer 11 of the third embodiment has the same exterior as that shown in FIG. 1.

Figure 15:
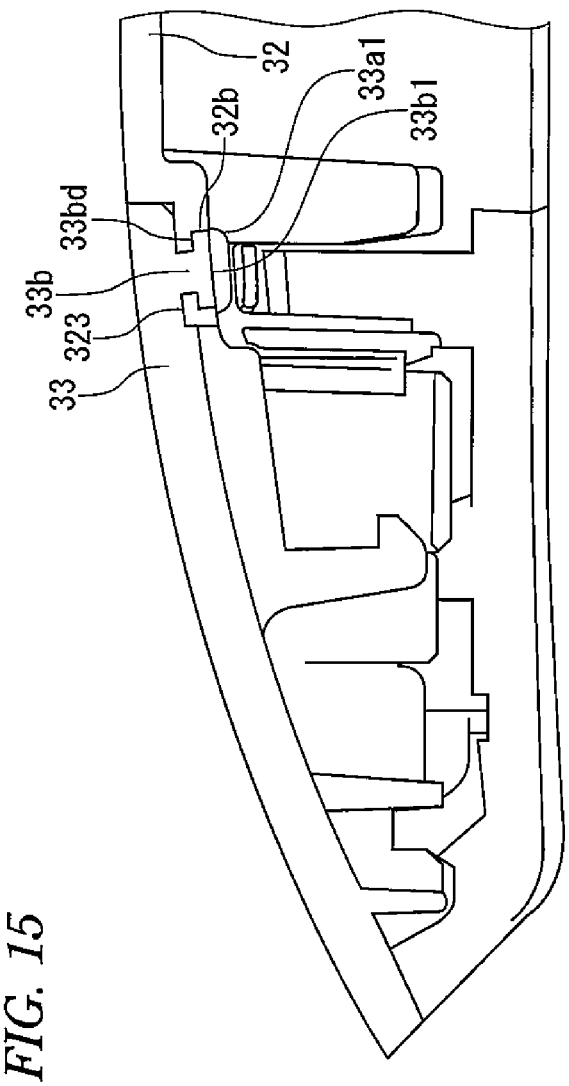
FIG. 15 is a cross-sectional view that shows a second portion of a portable computer which is an example of an electronic apparatus of a second embodiment.

As shown in FIG. 15, the second portion 33b of the third embodiment has a stepped portion 33bd. By such a configuration, similarly to the second embodiment, it is possible to increase the contact area between the second portion 33b and the opening portion 32b. The slope portion 33bs shown in FIG. 15 has a widening shape so as to be expanded toward the inner portion of the housing. By such a configuration, it is possible to make the joint strength of the second portion 33b closer to that of the first portion 33a, which can improve the joint strength between the housing and the antenna cover.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a housing including an opening portion and a cover portion provided with
      a first through-hole situated near the opening portion, the first through-hole connecting a first surface exposed on an outside and a second surface located on an opposite side of the first surface; and
      a second through-hole situated near the opening portion, in which a diameter of a first opening is smaller than a diameter of a second opening, the first opening corresponding to the first surface, and the second opening corresponding to the second surface;
   a display accommodated in the housing;
   an antenna provided near the opening portion;
   an antenna cover that covers the opening portion, the first through-hole, and the second through-hole; and
   a joint portion, which joins the housing and the antenna cover, the joint portion including
      a first portion in which a first front-end portion protrudes from the first through-hole to the housing inside, and a contacting portion is formed with the first front-end portion to contact the second surface; and
      a second portion situated in the second through-hole, and having a shape corresponding to a shape of the second through-hole, in which a second front-end portion is situated in a state of being approximately the same surface as the second surface.

2. The electronic apparatus according to claim 1, wherein the second through-hole is situated between a plurality of first through-holes.

3. The electronic apparatus according to claim 2, comprising
a plurality of first front-end portions, each protruding from a respective first through-hole of the plurality of first through-holes to the housing inside, wherein
a part of a component accommodated in the housing is situated between the plurality of first front-end portions.

4. The electronic apparatus according to claim 3, wherein the second-through hole is situated closer to a center portion of the housing than the first through-hole.

5. The electronic apparatus according to claim 3, wherein an inner wall of the second through-hole has a stepped portion.

6. The electronic apparatus according to claim 3, wherein an inner wall of the second through-hole has a slope portion.

* * * * *